April 28, 1970     H. P. BIRMINGHAM     3,509,524
INTENSITY-SEQUENCED OPTICAL GUIDANCE SYSTEM FOR VEHICLES
Filed Dec. 6, 1966     2 Sheets-Sheet 1

INVENTOR
HENRY P. BIRMINGHAM

BY
ATTORNEY

INVENTOR
HENRY P. BIRMINGHAM
BY
ATTORNEY

United States Patent Office

3,509,524
Patented Apr. 28, 1970

3,509,524
INTENSITY-SEQUENCED OPTICAL GUIDANCE SYSTEM FOR VEHICLES
Henry P. Birmingham, Alexandria, Va., assignor to the United States of America as represented by the Secretary of the Navy
Filed Dec. 6, 1966, Ser. No. 599,998
Int. Cl. G08g 5/00; G08b 5/00
U.S. Cl. 340—25    10 Claims

ABSTRACT OF THE DISCLOSURE

An optical guidance system wherein vehicle position information and vehicle motion error is optically coded by means of an intensity-sequenced color which is projected to the vehicle to be guided.

---

The invention described herein may be manufactured and used by or for the Government of the United States of America for governmental purposes without the payment of any royalties thereon or thereof.

A study of the problems inherent in optically guiding aircraft for night carrier landings has led to the development of an optical guidance system of general application to vehicle guidance. The present system utilizes the backward viewing of the projection of light and of light-intensity coding in a changing repetitive pattern to provide error command to the subject guided.

Aircraft landing aboard carriers continues to be an operation with an undesirably high accident rate. This is especially true of night landings where the pilot must rely primarily on the information provided by the optical guidance landing system aboard the carrier as the visual aid in landing. The system most widely used at the present time for this purpose is the Fresnel Lens Optical Landing System (FLOLS). This system which is located to one side of the carrier flight deck consists of a horizontal row of green datum lights and a vertical array of lenses focusing a single light indication, the so-called "Meatball," which appears vertically displaced from the datum lights in proportion to the landing plane's altitude error. If the landing plane is at the proper angle of approach on the glide path the "Meatball" is in alignment with the row of datum lights. When the incoming plane is too high the "Meatball" appears to be above the datum lights; and conversely, is displaced below the datum lights as seen by a pilot coming in below the glide path. The FLOLS thus aids the pilot attempting to land by providing him with altitude or position error information. This system and the other currently used systems, however, exhibit insufficient display gain, i.e. the ratio of observed error to actual error. Since the altitude error is indicated on the deck-mounted display by "Meatball" displacement, the observed signal is inversely proportional to the square of the pilot's range from the display. The effective display range of such a system is thus substantially limited. The other major inadequacy of the systems presently used is their failure to supply information on error in rate of change in altitude. At the prescribed one mile minimum distance for beginning the final leg of the approach, the "Meatball" displacement observed by the pilot is so small that it is virtually impossible for him to discern its rate of movement as he attempts to correct his position. If the pilot maneuvers his craft to correct for the indicated altitude error, his inability to determine the rate at which this correction should be made is likely to result in an oscillatory approach above and below the desired glide path.

Another optical guidance landing system which has recently been developed is the Rainbow Optical Landing System which is the subject matter of patent application Ser. No. 427,521, filed Jan. 22, 1965, now Patent No. 3,353,153. Although the Rainbow Optical Landing System (ROLS) provides sink rate error information to a landing aircraft it is necessary for the pilot to remember a specific sequence of colors in order to determine whether his sink rate or rate of descent is too great or too small. In addition, the ROLS does not provide the pilot with high-low information, i.e., whether the aircraft is above or below the desired glide path.

Therefore, it is the purpose of the present invention to provide that visual information to aid a pilot attempting to land which will insure an added margin of safety in landing, while overcoming the aforedescribed limitations of the systems now known and employed for this purpose. In order to accomplish this, an error signal is utilized which is coded, not by the change in position of an indicator as in the FLOLS and not by a change in color as in the ROLS, but by a change in light intensity which is readily discerned by the pilot. By using different colors above and below the desired glide path, so that the pilot sees only intensity changes of one color when he is above the desired glide path and intensity changes of one other color when he is below the desired glide path, the system of this invention indicates both the appropriateness of rate of change of position and the direction of position error. The intensity-coded source of light provides a system gain relatively independent of range within that distance at which the light can be seen by the pilot. The information on error in rate of change of position necessary to indicate the appropriateness of the pilot's approach is achieved by intensity coding the light source, while the position information is achieved by color coding the light source so that a different color is visible above the desired glide path from that which is visible below the desired glide path. The intensity coding is in a repetitive sequence so that the rate of change of intensity of the light source as seen by the pilot indicates the degree of correction required, while the kind of intensity change, i.e. light to dark or dark to light, witnessed indicates positive or negative correction is necessary in his rate of descent.

Accordingly, it is an object of the present invention to provide a method and apparatus for vehicle guidance using light-intensity coded visual commands.

Another object of the present invention is to provide by means of light-intensity coded signals a visual indication of error in rate of change of position or altitude to a landing aircraft.

A further object of the invention is the provision of a dynamic light-intensity coded visual command which provides a pilot during landing with information regarding the appropriateness of his rate of descent.

Still another object is to provide a color-coded visual guidance system to indicate aircraft position relative to a desired glide path.

Yet another object of the present invention is the provision of an optical guidance landing system which does not require pilot memorization of color sequences in order to determine the appropriateness of his rate of descent.

A still further object of the present invention is to provide an intensity-sequenced optical guidance landing system which has a gain or sensitivity relatively independent of range when compared with prior art systems.

With these and other objects in view, as will hereinafter more fully appear, and which will be more particularly pointed out in the claims, reference is now made to the following description taken in connection with the accompanying drawings in which:

Figure 1:
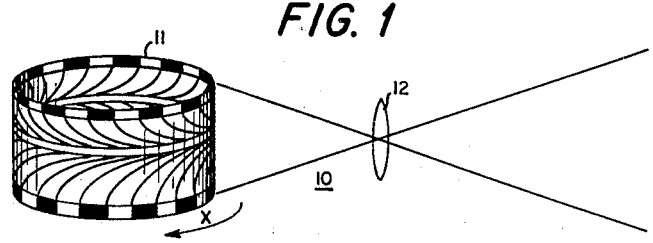
FIG. 1 shows a side elevation of the rotating cylinder and a lens of the invention.

Referring now to FIG. 1, there is shown a light-projecting apparatus which is comprised of a hollow transparent cylinder 11 and a projection lens 12. Although not shown in FIG. 1 the projecting apparatus 10 also includes a source of light which is centrally located within the hollow cylinder 11, and a condensing lens which is oriented within the transparent drum 11 and between the source of light and the projection lens 12. In addition, it is intended that the projecting apparatus 10 include a suitable housing and means to concentrate the light from the source into the lenses of the system. These lenses, in turn, will be adjusted so as to focus the projection object at optical infinity. The preferred embodiment of the projection object, shown by way of illustration only, is the hollow transparent cylinder 11 upon the wall of which an intensity-coded color pattern is affixed. When operating, the cylinder rotates about the high intensity light source (not shown in FIG. 1) and the condensing lens (not shown in FIG. 1) so that the intensity-coded color pattern moves in the focal plane of the projecting lens 12. The cylinder rotates in a direction which is indicated by the arrow "X," and is driven by a drive source which is not shown.

Because the operation of the present invention is based on the concept of backward projection it will be helpful to review this theory of operation and the objects sought to be achieved by the present invention in view of this concept.

Figure 3:
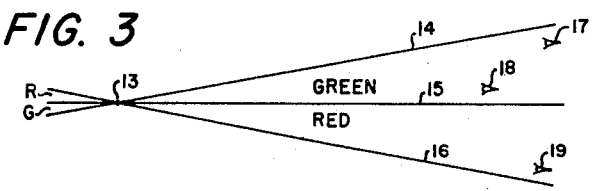
FIG. 3 show as ray diagram of a lens projection of a two-color slide to aid in an understanding of the instant invention.

To aid in an understanding of the concept of backward projection FIG. 3 shows a two-color beam of light generated by a light source (not shown), which light beam is filtered by a two-color slide indicated by R and G, where R is red and G is green, and which is projected from the projector 13. After the light from the light source has passed through the slide and the lens system of the projector 13 the upper half of the light beam is green, generally indicated by lines 14 and 15, while the lower portion of the beam is red and extends between lines 15 and 16. Also shown in the figure are three viewers indicated by representations of eyes at positions 17, 18 and 19. If the light beam is focused at optical infinity, and the viewers are positioned at sufficient distance for the beam to be in focus, it will be noted that the viewers at positions 17 and 18 will be in the green portion of the beam and the viewer at 19 will be in the red portion, due to the inversion occasioned by the projecting lens system of projector 13. The viewers are looking back into the projector 13 and as a result only green light will be seen from the source at positions 17 and 18, while the light seen by a viewer at 19 is red. Because the apparent color of the lens is a function of the eye's position, the need for sensing eye position by mechanical or electronic instruments is obviated. The concept of backward projection is thus very simply the direct viewing of the light from the projector and not the usual viewing of an image projected onto a screen.

Still considering the system shown in FIG. 3, if it were to be used as an optical guidance landing system and if line 15, dividing the green from the red portion of the beam, were to be considered the desired glide path, a pilot flying toward the projector 13 at position 17 would see only green light, and if at position 19 would see only red light. If the pilot, formerly at position 17 is now at position 18, he will still see green light because he remains above the glide path 15. With green light indicating to the pilot that he is too high and red light indicating that he is too low, his correction of position from 17 to 18 has failed to produce a change in indication even though he is indeed closer to the correct angle of approach and to glide path 15. Such a static system lacks the ability of indicating the size of the error relative to the desired glide path and it provides no sink rate information. The pilot at position 18 has no indication that the green is about to become red, i.e. that he is about to go from a positive error through the proper glide path into a position of negative altitude error. As a result, the pilot would most probably oscillate in his flight path until by trial and error he might zero in on the desired glide path. Additionally, since the two-color slide filtering the projected light is stationary there is no means for presenting altitude rate of change information.

Figure 4:
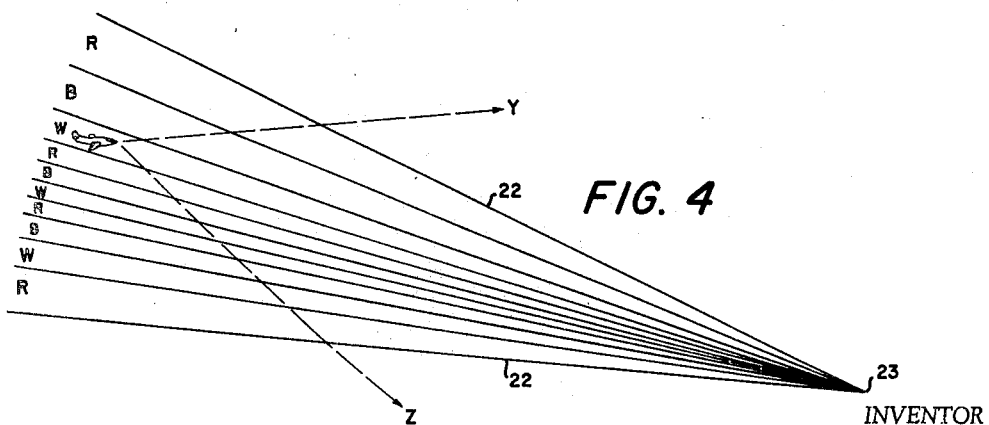
FIG. 4 is a side elevation showing the information provided by a color-coded static optical guidance system.

FIG. 4 shows a static system similar to that shown in FIG. 3 which for the purposes of illustration is enlarged to contain additional pencils of light in excess of the two pencils shown in FIG. 3. The light beam 22 may be projected from the landing deck of an aircraft carrier (not shown) or from a position on the ground by projector 23. The light beam 22, as shown in FIG. 4, is divided angularly into a plurality of colored pencils, indicated from top to bottom by the letters R, B, W, R, B, W, R, B, and W where R is red, B is blue, and W is white. The two-color slide represented in FIG. 3 has thus been replaced by a slide in a projector having three colors, e.g. red, blue, and white in a repetitive pattern, and the colors are repetitive in that order in a vertical display. Therefore, when using this multi-colored static display it can be seen that a pilot, shown at 21, in the white pencil of this static display will see the source 23 as the color white.

It is clear from FIG. 4 that if the pilot at 21 should fly in a path generally indicated by the dashed line Y he would see the light source 23 appear to change color from white to blue to red as he passed through the pencils of these colors. With previous knowledge that the projected beam was divided in the repeated sequency of red, blue, white, red, blue, white, from top to bottom, he would know as he saw the light change that his rate of descent was too small. In like manner as the pilot flies along the path designated by the dashed line Z, he would see the source of light change from white to red to blue and he will know that his rate of change of altitude, as indicated by the color sequencing, is too great. Should the pilot observe a single constant color, he will know that he should maintain his existing rate of change of altitude as he flies toward the light source in order to fly a straight path to the touchdown point. The same information is obtained from any position in the pattern of light pencils and at any range, limited only by the pilot's ability to see the signal light on the landing area.

It can be seen, therefore, that the static guidance system shown in FIG. 4 would provide optical information to a pilot so as to guide him to the proper point of touchdown along any single colored pencil in the display. However, following any one of these single colored pencils above an optimum glide slope might well result in a hard landing and possible damage to the aircraft. Conversely, by following any one of the pencils below the optimum glide path the pilot may find that he is unable to make ramp clearance in the case of aircraft carriers or that he faces some ground obstructions as a result of his low level of approach in the event that the projector 23 is located on the ground rather than on the deck of an aircraft carrier.

Figure 5:
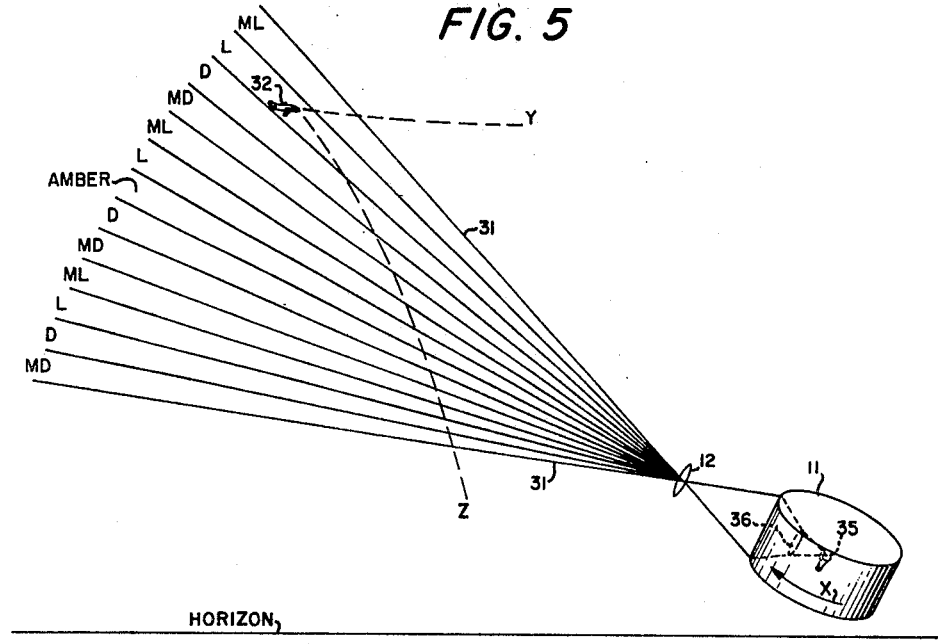
FIG. 5 shows a side elevation partially cut away, of the present invention and the information provided thereby.

If the static display of FIG. 4 is replaced by the dynamic intensity-sequenced optical guidance system of this invention, which is shown in FIG. 5, the ease of achieving a position within the desired glide path is increased and the danger of a hard landing or of an approach which is too low is obviated.

FIG. 5 shows the cylinder 11 with light source 35 centrally located therein. In addition, condensing lens 36 is shown located between the light source 35 and the cylinder 11. The pencils of light in the light beam 31 of FIG. 5 are distinguished from one another by being different intensities of the same color. The light beam is divided angularly into a plurality of intensity-coded pencils, indicated from top to bottom by the letters ML, L, D. MD, ML and L where D is dark, L is light, ML is medium light and MD is medium dark. In addition, the letter A represents the color amber which is indicative of the desired glide path.

In addition to being intensity coded rather than color coded, as is the case in FIG. 4, the pencils of repeated color intensities in FIG. 5 are caused to converge from above and below the desired glide path to the amber pencil of light so that the pilot flying in any one intensity will be guided into the proper angle of approach to touchdown. These are the primary differences which exist between the static array shown in FIG. 4 and the dynamic optical guidance system shown in FIG. 5. The intensity-coded cylinder 11 is caused to move continuously in the direction indicated by the letter X such that the dark, medium dark, medium light and light pencils are repeatedly cycled into and toward the amber pencil which is representative of the desired glide path. This continuously converging pattern of color intensity will lead the pilot in the aircraft 32 into the desired glide path regardless of the particular intensity which he is following.

Since it is desirable to optimize the aircraft's approach to glide path so as to prevent an oscillatory approach, each dynamic light intensity pencil is made to converge upon the amber on-glide-path pencil at a rate which is proportional to its instantaneous angle from the glide path, i.e. at an exponential rate. In addition, since it is desired that the ideal angle of approach be closely approximated, the amber pencil which indicates the desired glide path is quite narrow, i.e. the amber color is a ±0.1° angular envelope about the proper glide path thus subtending 35 feet at a range of 10,000 feet and approximately 1¾ feet at a range of 500 feet. The color intensity pencils converging on the glide path are characterized by a width decreasing in proportion to their closeness to that path.

Figure 2:
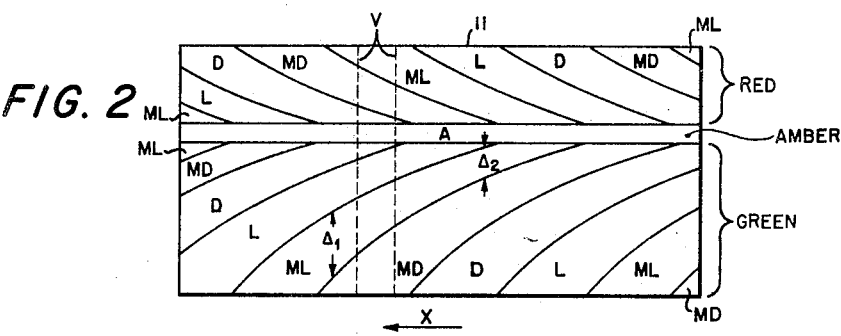
FIG. 2 illustrates a portion of the wall of the cylinder shown in FIG. 1.

With this background it is now appropriate to explain the developed view in FIG. 2 of the portion of the wall of the rotating cylinder 11. A thin horizontal stripe is shown on the cylinder 11 parallel to the line of drive X of the cylinder and approximately ⅓ of the distance from the top of this cylinder wall view. This stripe labeled A for amber represents the proper glide path. The remainder of the pattern shown in this figure is a series of bands labeled L, ML, MD and D, designating light, medium light, medium dark and dark. This series of bands are shown converging exponentially from the outer edges of the cylinder wall into the glide path band A. As the cylinder is driven in the direction X, a column of light indicated by dashed lines at the position V, for example, would be divided from top to bottom into the color intensities medium light, medium dark, dark, amber, dark, light, medium light and medium dark with each moving color intensity converging down from the top and up the column V from the bottom into the amber. It will be noted that because of the steeper angle of the intensity bands at the outer edge of the cylinder, the vertical movement of these bands at the pilot's eye will be more rapid and will gradually slow with the lessening angle at an exponential rate as the bands approach the amber. The change in vertical dimension on any of the dark, medium dark, medium light or light bands across the cylinder, as indicated by the dimensions, and in the medium light band shown in FIG. 2, is also to be noted. These characteristics i.e. the exponential convergence of the intensity bands toward the amber and the narrowing vertical dimensions of each of the intensity bands as they approach the amber, account for the aforedescribed movement toward the amber of each light intensity pencil within the projected beam. The rate of this movement is directly proportional to the distance from the glide path because each pencil undergoes a change in vertical dimension in proportion to its distance from that path. It should be noted that FIG. 2 is simplified for the purpose of illustration and that in practice there may be several sets of intensity bands above and below the glide path where each set includes the series of L, ML, MD and D intensities.

In using the intensity-sequenced optical guidance landing system of this invention a pilot following the guidance or command of the projected light beam interprets the changing light intensity sequence as an indication of sink rate error, a steady amber light as an indication that he is within the fixed limits of the glide path, and any steady light intensity other than amber as an indication that he is off glide path but is approaching it from above or below at the correct rate. The rate of the light intensity sequencing indicates to the pilot the extent of his descent rate error; that is, if the light intensity sequence cycles slowly he knows that his rate of descent is very close to that commanded by the system, while rapid light intensity change informs the pilot that his rate of descent is quite different from that commanded by the system.

In addition, because of the intensity sequencing of the light beam the pilot by noting the type of intensity sequence can determine whether his rate of descent is too great or not great enough. By reference to FIGS. 2 and 5 it can be seen that if the pilot's rate of descent is too great he will see a repetitive intensity sequence of D, MD, ML and L, i.e. the light intensity becomes lighter. Conversely, if the pilot's rate of descent is not great enough he will see a repetitive intensity sequence of L, ML, MD and D, i.e. the light intensity becomes darker. Thus, it is only necessary for the pilot to remember that if the intensity sequence becomes darker that he should apply less power to the aircraft so as to increase its rate of descent and if the intensity sequence becomes lighter that he should increase his power so as to decrease his rate of descent. In response to light intensity change, therefore, the pilot must manuever his craft by correcting his rate of descent until the light intensity change becomes slower and until finally a constant light intensity is observed. Once a single light intensity is observed the pilot has performed his task by manuevering his craft into this appropriate path and can maintain his present rate of descent knowing that even if he strays from his single light intensity pencil any other light intensity pencil will bring him into the ideal glide path for landing.

In the view of the wall of cylinder 11, shown in FIG. 2, the amber stripe representing the glide path is positioned approximately one third of the distance from the top of the cylinder. The placement of the band is to obtain the desired result of having the glide path two degrees above the bottom of the projected beam with four degrees of the pattern above the proper landing path. The placement of the amber band near the bottom one third of the light beam as seen by the pilot is due to the inversion caused by the condensing lens 36 which is located between the light source 35 and cylinder 11 and by the projection lens 12. It should be understood of course that the placement of the amber band in no way limits the scope of this invention, but rather that the band may be placed at any point on the cylinder wall 11 to obtain a desired result of glide path location.

The light intensity pattern experimentally tested was projected by a 1,000 watt lamp which was sighted and utilizes at a range of 3½ miles in bright sunlight. This means that a pilot flying his aircraft at 175 miles per hour obtains useful control information for approximately 1.25 minutes before touchdown. The experimental unit has a vertical field of view of 4° above glide path and 2° below glide path and a lateral field of ±5°. In the experimental unit the amber on-glide-path indication is ±0.1°, i.e. at a range of 10,000 feet, the pilot receiving the amber indication is controlling his aircraft altitude with a precision of ±17.5 feet and at 500 feet from touchdown with a precision of ±0.875 foot.

It should be understood that the cylinder pattern could readily be modified in any one of a number of ways to provide an indication of the outer limits of the projected light beam. For example, this could be accomplished by having the edges of the pattern contain a band parallel to the glide path band and having a series of repeated opaque and colored bars within that band which would when projected form outer pencils of flashing light of a color chosen to warn the approaching aircraft that it is dangerously high or low.

Figure 6:
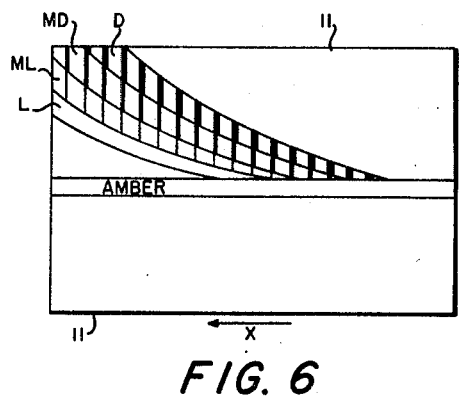
FIG. 6 illustrates in detail a portion of the wall of the cylinder shown in FIG. 1 and shows the manner in which different light intensities are created.

Several ways of obtaining the desired color intensities on the cylinder 11 may be used, but the one preferred is that which is achieved by the superposition of thin, vertical opaque lines which are spaced apart from each other within each color intensity band as shown in FIG. 6. The various levels of color intensity are achieved by varying the ratio of the width of the transparent lines to the width of the opaque lines within each band. For example, four levels of intensity are shown, each one reduced from the previous one by a predetermined percentage. The superposition of the opaque lines is accomplished by known photographic methods and the opaque lines are made small enough and are placed close enough together so that at the anticipated cylinder rotation speed, and due to the resolution capability of the eye, no flicker will be observed by the pilot. The cylinder pattern could also be fabricated without the use of vertical opaque bars to attenuate color transmission. For example, the cylinder bands could be painted in four shades of grey and then photographed. However, precise transmission control is much more difficult when using this method.

The principles of the optical guidance system of the present invention have been described with reference to the preferred embodiment, e.g. an aircraft landing system. However, the principles of backward projection of light and dynamic intensity coding of that light in a repetitive pattern have general application to all types of vehicle guidance. For example, with the cylinder of FIG. 1 turned on its side, bearing information could be displayed to guide ships through a narrow channel. Horizontally displayed information could also be projected from the lead aircraft in a formation to guide the other planes in maintaining their relative positions. Moreover, such a system projecting information the recognition of which is relatively independent of range once the light is visible, has many applications in space whenever optical guidance of vehicles is desired.

It can be seen that the system of this invention effectively provides a pilot with the information necessary to accomplish safe landings, both on the ground and on board aircraft carriers. This system, by using the principle of color intensity sequencing, is able to provide a pilot with high-low information, i.e. whether he is above or below the desired glide path, and with sink rate error information which is determined by the sequencing of the intensity of the light. Because changes of color are no longer used to encode sink rate error it is not necessary that the pilot remember a certain sequence of colors so as to determine whether his sink rate is too little or too great. Rather, it is only necessary when using this invention for the pilot to remember color intensity change. The interpretation of intensity sequencing is more easily accomplished than the interpretation of color sequencing because a change in intensity is more easily remembered than a change in colors.

It should be understood that although four different bands of color intensity are disclosed either a greater or lesser number of different bands could be used. A theoretically infinite number of color intensities could be used so that discrete intensity bands would not be present. In addition, it should be understood that the widths of each of the intensity bands need not be equal. For example, the lightest intensity band could be made narrower than the darker bands in order to compensate for the eyes' inability to rapidly sense a change from a light intensity to a darker intensity. Also, it should be understood that it is not necessary to the operation of this invention that the intensity bands converge exponentially onto the amber glide path band. As the different intensity bands approach the glide path band they may do so in a linear manner immediately before they converge into the glide path band.

Obviously many modifications and variations of the present invention are possible in the light of the above teachings. It is therefore to be understood the invention may be practiced otherwise than as specifically described.

I claim:

1. An intensity-sequenced optical guidance landing system for providing position information and rate of change of position information from a landing surface comprising:
    at least one light source;
    an optical lens system operatively associated with said light source to form a light beam focused at optical infinity;
    intensity-coded means for operation with said light source and said lens system to provide position information and rate of change of position information to an approaching aircraft;
    said intensity-coded means having a plurality of transparent sectors arranged in a pattern such that adjacent sectors have different degrees of transparency; and
    rotating means for rotating said intensity-coded means through said light beam in a predetermined direction.

2. The system of claim 1 wherein a predetermined portion of said light beam is directed at an angle to said landing surface representative of the desired glide path for said aircraft.

3. The system of claim 1 wherein said optical lens system includes at least a condensing lens and a projection lens.

4. The system of claim 1 wherein said intensity-coded means includes a wall with a repetitive pattern thereon said pattern comprising a plurality of bands of at least three different intensities of a first color converging onto a first side of a single band of a second color;
    a plurality of bands of at least three different intensities of a third color converging onto a second side of said single band;
    said single band being located on said intensity-coded means parallel to said predetermined direction;
    whereby said light beam which passes through said fixed light pencil of a second color;
    intensity-coded means is angularly divided into light pencils of at least three different intensities of said first color which repeatedly converge from a first direction onto a single light pencil of said second color and whereby said light beam is angularly divided into light pencils of at least three different intensities of said third color which repeatedly converge from a second direction onto said single light pencil of said second color so that a pilot flying into said light beam will see said light source change intensity while his rate of descent differs from the rate of intensity level convergence of said light pencils of different intensities onto said single light pencil and will see said light source remain a constant light intensity of said first or third color becoming said second color, representing said desired glide path, when his rate of descent matches the rate of intensity level convergence.

5. The system of claim 4 wherein a predetermined number of said plurality of bands of different intensities comprises:
   a plurality of thin transparent lines spaced apart from each other;
   a plurality of thin opaque lines spaced apart from each other and between said transparent lines so when said bands are moved in front of said light source at a predetermined speed the bands appear to be of different intensities.

6. The system of claim 5 wherein said transparent lines are thinner than said opaque lines.

7. The system of claim 5 wherein said opaque lines are thinner than said transparent lines.

8. The system of claim 5 wherein the ratio of the width of said opaque lines to the width of said transparent lines increases in a repetitive sequence from one of said intensity bands of lightest intensity to one of said intensity bands of darkest intensity.

9. The method of guiding an aircraft to a safe landing by visual commands from the landing area comprising:
   projecting a dynamic light beam with a predetermined portion thereof at an angle equal to the desired glide path angle from said landing area, said light beam including light pencils of at least three different intensities of a first color which converge downward and in a repetitive sequence into a fixed light pencil of a second color, and including light pencils of at least three different intensities of a third color which converge upward in a repetitive sequence into said
   maneuvering said aircraft to remain within any one of said light pencils of different intensities of said first or third colors until said aircraft comes within said fixed light pencil of said second color; and
   maneuvering said aircraft to remain within said fixed light pencil until touchdown of the aircraft upon the landing surface.

10. The method of claim 9 wherein said first step of maneuvering includes adjusting the rate of descent of the aircraft to match the rate of convergence of said light pencils of different intensities onto said fixed light pencil.

References Cited

UNITED STATES PATENTS 3,353,153   11/1967   Birmingham et al. _____ 340—26

ALVIN H. WARING, Primary Examiner

U.S. Cl. X.R.

240—1.2